Jan. 30, 1968   J. L. LAUER   3,366,452
PROCESS FOR PREPARING CARBON MONOXIDE, CARBON
DISULFIDE, SULFUR, ETHYLENE AND ACETYLENE
FROM WELL GAS
Filed April 13, 1966
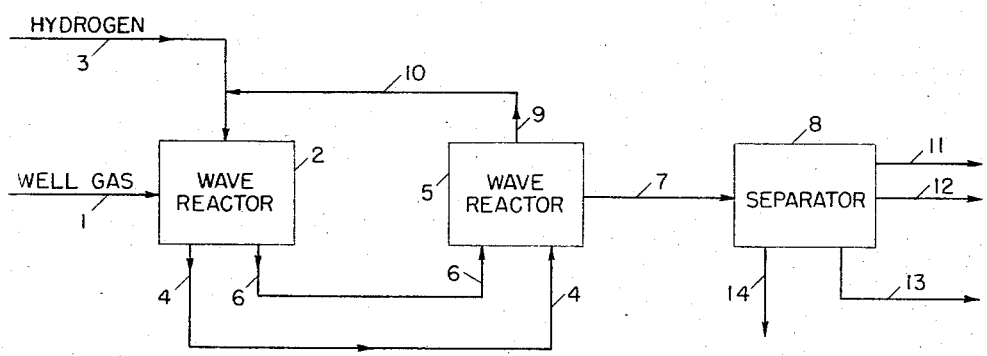
INVENTOR.
JAMES L. LAUER
BY George L. Church
ATTORNEY 3,366,452
PROCESS FOR PREPARING CARBON MONOXIDE, CARBON DISULFIDE, SULFUR, ETHYLENE AND ACETYLENE FROM WELL GAS
James L. Lauer, Penn Wynne, Pa., assignor to Sun Oil Company, Philadelphia, Pa., a corporation of New Jersey
Continuation-in-part of application Ser. No. 406,744, Oct. 27, 1964. This application Apr. 13, 1966, Ser. No. 552,660
1 Claim. (Cl. 23—204)

ABSTRACT OF THE DISCLOSURE

A method for preparing chemical products directly from well gas at the well head site which comprises effecting a pressure interchange between high pressure well gas and low pressure hydrogen in a first wave reactor and subsequently effecting reaction of the well gas in a second wave reactor by using the formed high pressure hydrogen as the driver gas in the second reactor.

This application is a continuation-in-part of application Ser. No. 406,744, filed Oct. 27, 1964, now abandoned.

This invention relates to a method for preparing chemical products. More specifically, this invention relates to a method for preparing chemical products directly from high pressure well gas.

As used in this specification and appended claims, the term high pressure well gas and related terms shall mean a gaseous flow emanating from either an oil well or a well drilled specifically for the purpose of obtaining gaseous material. The well gas will normally contain methane, hydrogen sulfide, carbon dioxide, water vapor, other low molecular weight hydrocarbons up to and including about $C_6$ hydrocarbons, and may also contain other inert gaseous materials such as nitrogen and helium. The gas at the well head will normally be at a pressure of at least 400 p.s.i.g. and can range up to as high as 10,000 p.s.i.g.

Heretofore, well gas has been used almost exclusively as a fuel. Certain prior attempts have been made to prepare chemical materials from well gas. These prior art processes, however, have invariably involved a multiplicity of processing steps including liquefaction, transportation, separation, etc. As a result, little or no commercialization has been developed to date for the preparation of valuable chemical materials directly from well gas.

A method has now been found whereby desirable chemical materials such as ethylene, actylene, carbon disulfide, carbon monoxide, sulfur, methanol, formaldehyde, and other products formed by aromatization and alkylation can be prepared directly from well gas at the well head site.

Briefly stated, the instant invention comprises introducing a high pressure well gas into a first wave reactor. Prior to the introduction of the high pressure well gas, the first wave reactor is charged with a low molecular weight gaseous material such as hydrogen. The hydrogen is charged to the first wave reactor at a pressure lower than that of the well gas, i.e., less than a pressure of about 200 p.s.i.g.

There occurs in the first wave reactor a pressure interchange between the well gas and the hydrogen, whereby the well gas is removed from the first reactor at a pressure substantially lower than that at which it was introduced, and conversely the hydrogen is removed from the first reactor at a pressure substantially higher than that at which it was introduced. In this first reactor, in order to effect a suitable pressure interchange, the pressure of the well gas must be at least three times the pressure of the hydrogen. While theoretically the instant process would be operable if the well gas were at a pressure of three atmospheres and the hydrogen were at a pressure of one atmosphere, it is preferred that the pressure of the well gas be at least 400 p.s.i.g. In a similar manner the pressure of the hydrogen should be less than 130 p.s.i.g.

The low pressure stream of well gas removed from the first reactor is introduced into a second wave reactor at a relatively low pressure; as such it is in the form of a reaction mixture. The hydrogen is introduced into the second wave reactor at a relatively high pressure; as such it is in the form of an inert driver gas. In this second reactor, in order to effect a reaction to produce the desired chemical products, the hydrogen must be at a pressure of at least 15 times the pressure of the well gas. It has been found that so long as the pressure of the well gas is at least three times the pressure of the hydrogen when exchanged in the first reactor, the final pressure of the hydrogen will be at least 15 times the pressure of the well gas in the second reactor.

It has also been found that temperatures of the order of 1300° C. (minimum needed to effect the desired reactions) will not be produced unless the pressure of the hydrogen in the second reactor is at least 15 times the pressure of the well gas. More usually, however, pressure differences of 15:1 will generate temperatures of the order of 1800° C. which temperatures are more preferred.

After reaction, within the second reactor, through a shock, high-pressure, high-temperature, rapid-quench mechanism, there is removed from the second reactor a high pressure product stream which can be easily liquefield and separated into its various components. This high pressure product stream can also contain some hydrogen admixed therewith which can be separated and recycled to the first wave reactor.

There is also removed from the second wave reactor the hydrogen driver gas which is now at a relatively low pressure and can either be recycled to the first wave reactor or vented to the atmosphere.

As stated above, well gas is composed of a multiplicity of gaseous materials. Conventionally, these materials are contained therein in the following relative amounts.

| Compound: | Mol. percent |
|---|---|
| Nitrogen | 0–15.5 |
| Carbon monoxide | 0–15.5 |
| Carbon dioxide | 0–2.25 |
| Hydrogen sulfide | 9–50 |
| Helium | 0–1.0 |
| Air | 0–3.5 |
| Methane | 50–98.5 |
| Ethane | 0.8–19.7 |
| Propane | 0.2–13.0 |
| Butanes | 0.3–6.5 |
| Pentanes | 0–3.2 |
| Hexanes and higher | 0–0.5 |

According to the process of this invention, the following reactions can take place:

(1) $8CH_4 \rightarrow C_2H_2 + 9H_2 + 3C_2H_4$
(2) $CH_4 + H_2S \rightarrow CS_2 + 3H_2$
(3) $CO_2 + H_2S \rightarrow CO + S + H_2O$
(4) $2CH_4 + O_2 \rightarrow 2CH_3OH \rightarrow 2HCHO + 2H_2$
(5) $CH_4 + H_2O \rightarrow CO + 3H_2$ In addition to the specific reactions noted above, other reactions which can take place include aromatization, alkylation and diolefin formation.

The wave reactors used in the process of this invention are old and well known in the art. For example, wave reactors of the type described in U.S. Patents Nos. 2,832,666 and 2,902,337 can be utilized herein. Also, wave reactors of the type described in copending applications Ser. No. 326,009, filed Nov. 26, 1963, now U.S. Patent No. 3,254,-960 and Ser. No. 349,884, filed Mar. 6, 1964, now U.S. Patent No. 3,262,757, can be used.

The preferred reactors to be used in this invention are those described in the copending applications named above. Such reactors include a straight elongated tube rotatably driven at a high rate of speed about an axis transverse to its length, within a port ring whose longitudinal axis is substantially collinear with the axis of rotation of the tube. The port ring contains numerous ports or passages by means of which gases are conveyed to and from the inner cylindrical surface of the ring, the tube as it rotates coming into communication with these passages or ports successively in a definite order. Assuming that the tube has been charged with a reactor material, the two ends of the tube, as it rotates, are suddenly simultaneously brought into communication with a source of high pressure driving gas such as hydrogen. The hydrogen enters the tube with high velocity from both ends, creating two shock waves which push the reactant material (assumed to be already in the tube) toward the middle. This adiabatic compression compresses the process gas and brings it very rapidly to a high reaction temperature, on the order of 1760° C. This high temperature causes the above-mentioned chemical reactions to take place, producing desired chemical products as well as by-product hydrogen.

Following the compression process, both ends of the rotating tube come into alignment with passages in the port ring which operate to withdraw the driving gas, leaving essentially only products produced by the above reactions in the tube.

Thereafter, one end of the tube comes into communication with passages in the port ring which are connected to conduits for withdrawing the desired chemical produce from the tube. At or about the same time, the opposite end of the tube comes into communication with passages in the port ring which are coupled to conduits supplying reactant material to the tube. This supply of new reactant material assists in purging or removing the products from the tube, as well as providing a fresh charge of reactant material for the next cycle of operation. This new cycle then proceeds with the fresh charge in the tube followed by the creation of shock waves by the driving gas as before.

The attached drawing is a schematic representation of the operation of the process according to this invention. A high pressure well gas (at about 900 p.s.i.g. and a temperature of about 600° C.) is obtained from a source (not shown) then passed through line 1 to a first wave reactor 2. Hydrogen at a pressure of about 300 p.s.i.g. obtained from a source (not shown) is introduced into wave reactor 2 through line 3. After passage through wave reactor 2, the well gas (now at low pressure, i.e., at about 30 p.s.i.g.) is removed through line 4 and introduced into wave reactor 5. Hydrogen is removed from wave reactor 2 through line 6; the hydrogen in line 6 is now at a pressure of about 750 p.s.i.g. and introduced through line 6 into wave reactor 5. After reaction in wave reactor 5, a mixture of products is withdrawn through line 7, then passed through separator 8. Excess hydrogen is removed from wave reactor 5 through line 9 and either vented or preferably recycled to wave reactor 2 through line 10. The desired products are recovered from separator 8 through lines 11, 12, 13 and 14.

This invention will be further understood by reference to the following illustrative examples:

*Example I*

A particular gas well having the following gaseous composition: methane, 30%; hydrogen sulfide, 40%; and carbon dioxide, 30% is connected to a first wave reactor. The first wave reactor is charged with hydrogen at a relatively low pressure, i.e., 200 p.s.i.g. The pressure of the gases at the well head is 900 p.s.i.g. The well gases are introduced into the first wave reactor and there occurs therein a pressure interchange. The well gases are removed from the first wave reactor at a relatively low pressure, i.e., 50 p.s.i.g. and introduced into a second wave reactor. The hydrogen is removed from the first wave reactor and introduced into the second wave reactor at a relatively high pressure, i.e., 800 p.s.i.g. and is used as the driver gas for the reactions to take place therein. After being utilized as the driver gas, the hydrogen is removed from the second wave reactor and recycled to the first wave reactor. The reaction products are removed from the second wave reactor to a separator, and there is recovered therefrom acetylene, carbon disulfide, elemental sulfur, ethylene and carbon monoxide.

*Example II*

Example I is repeated except that the well gas is composed entirely of hydrogen sulfide and methane. The product recovered is predominantly carbon disulfide along with lesser amounts of ethylene and acetylene.

It will be apparent to those skilled in the art that many other variations may be desirable and may readily be produced according to the method of this invention to increase efficiency or to accommodate other types of gas phase reactions involving other gaseous reactants as may be contained in well gas as set forth above.

I claim:
1. Method for preparing chemical products selected from the group consisting of ethylene, acetylene, carbon disulfide, carbon monoxide, and sulfur directly from well gas comprising methane, hydrogen sulfide, and carbon dioxide at a pressure of at least 600 p.s.i.g. and ranging up to about 10,000 p.s.i.g. which comprises
   (a) introducing the high pressure well gas into a first wave reactor containing hydrogen at a pressure less than about 200 p.s.i.g. whereby a pressure interchange between the well gas and hydrogen occurs;
   (b) removing from said wave reactor a low pressure stream of well gas and a high pressure stream of hydrogen wherein the pressure of the stream of hydrogen is at least 15 times the pressure of the stream of well gas;
   (c) introducing the low pressure stream of well gas into a second wave reactor as reactant material;
   (d) introducing said high pressure stream of hydrogen into said second reactor as driver gas to effect reaction and interaction of the well gas components; and
   (e) removing, separating and recovering gaseous products from said second reactor.

References Cited

UNITED STATES PATENTS

| | | | |
|---|---|---|---|
| 2,832,666 | 4/1958 | Hertzberg et al. | 23—1 |
| 2,902,337 | 9/1959 | Glick et al. | 23—1 |
| 2,908,733 | 10/1959 | Sage | 260—679 |
| 2,983,661 | 5/1961 | Lauer | 204—156 |
| 2,986,505 | 5/1961 | Lauer et al. | 204—156 |
| 3,192,280 | 6/1965 | Landgren | 260—679 |
| 3,254,960 | 6/1966 | Hansel | 23—252 |
| 3,262,757 | 7/1966 | Bodmer | 23—284 |

MILTON WEISSMAN, *Primary Examiner.*

OSCAR R. VERTIZ, *Examiner.*

B. H. LEVENSON, *Assistant Examiner.*